UNITED STATES PATENT OFFICE.

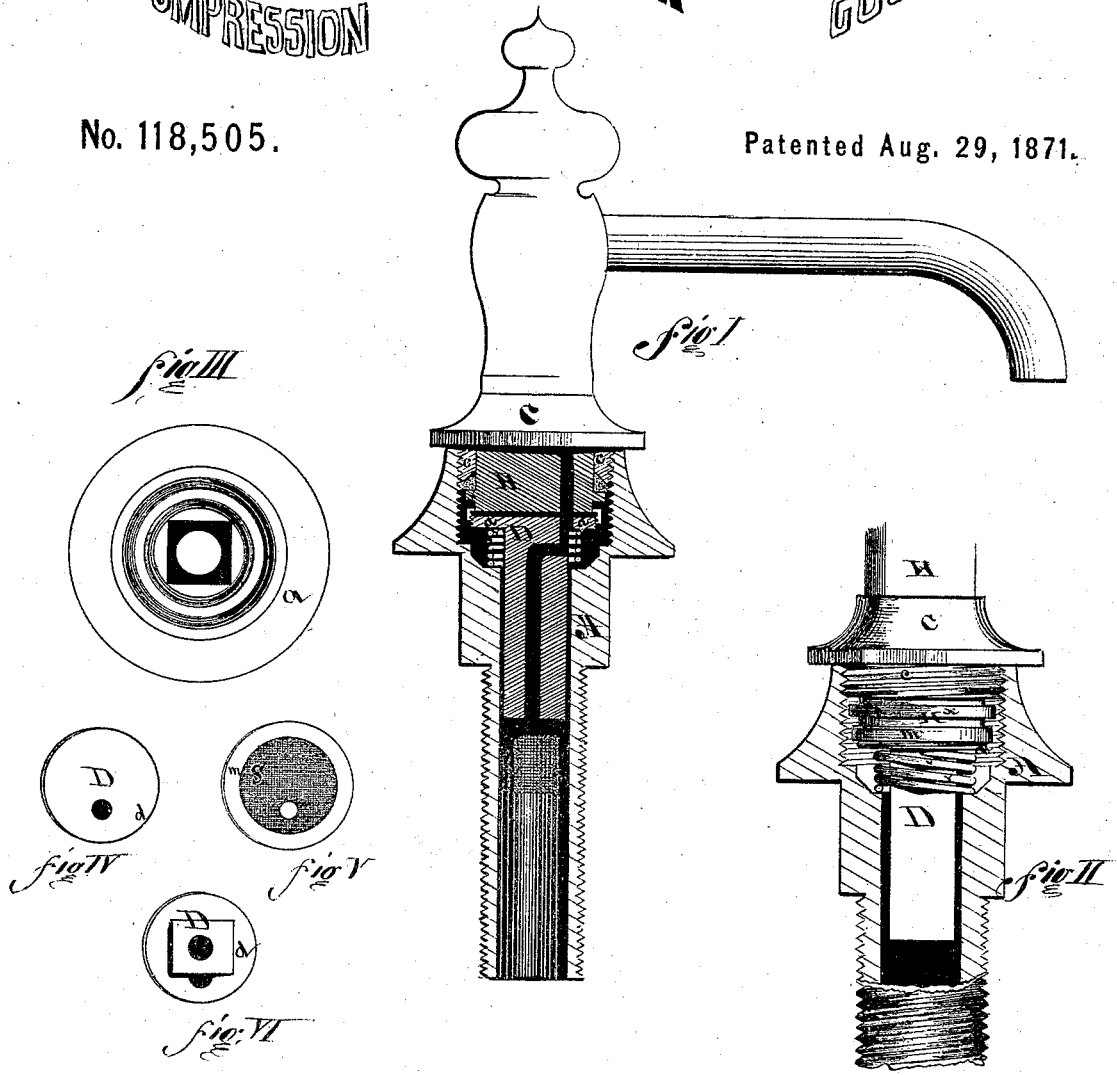

OAKLEY N. AMES, OF HAYDENVILLE, MASSACHUSETTS.

IMPROVEMENT IN COMPRESSION COCKS.

Specification forming part of Letters Patent No. 118,505, dated August 29, 1871.

*To all whom it may concern:*

Be it known that I, OAKLEY N. AMES, of Haydenville, Hampshire county, Commonwealth of Massachusetts, have invented a Compression Swing-Basin Cock, of which the following is a specification:

My invention relates to so constructing a swing-basin cock that the seat of the valve shall be compressed constantly against the plug both by the action of the water and by the power of a spring assisting its action; and the object of the construction and combination of the parts of my invention is to obtain a cock in which the pressure of the water in the supply-pipe is utilized to aid in rendering leakage impossible, while, if used in connection with a small head of water, is still made perfectly tight by the operating spring.

Figure I is a complete side sectional view. Fig. II a partial side section. Fig. III is an end view of the lower part of the case with the parts removed; and Figs. IV, V, and VI are detail views of different parts of the valve.

The case A, forming a prolongation of the water-pipe by being coupled to it, is made larger, internally, at its upper end, to receive the screw-flange $c$ of the nut C, which is screwed into it, the rotating plug H, the flanged end $d$ of the valve D, and the coiled spring $v$, this cavity being then reduced to a square or angular internal face, to receive the flat-sided stem of valve D, which can thus rise and fall, but have no revolving movement, a shoulder being left for a bearing for spring $v$, supporting the flange $d$ of the valve. The plug H, passing through the nut C and being seated on the valve D, is provided with a rim, $x$, which holds between it and the flange $c$ the packing, so that the tightness of the joint is in a ratio with the pressure upon the face of the plug from below, and any wear of the plug is taken up by the spring.

The valve D is constructed as follows: The stem, being made square or otherwise so shaped that it may rise or fall in a recess, but have no rotating motion, is surmounted by a circular flange, the flat top of which forms the valve-seat, and is packed on its face by a piece of rubber, $g$, or other suitable material, held in place by a rim, $m$, screwed over the edge of the flange $d$.

I am aware that the faces of valves have been covered by having the packing countersunk; but by my improved arrangement the rubber may be replaced, when rotted or worn, by simply removing rim $m$.

The port for the passage of the water proceeds through the center of the stem longitudinally, until nearly to the flange, when it makes a right turn to the outside of the stem, so as to permit the water to bear on all sides of the flange $d$ when passing through the flange, and consequently, through the face of the valve at a point to one side of its center, permits the water free egress from the cock when the plug is so turned that the port in it forms a connected water-passage.

In placing the valve D in position with its stem through its spring and in the angular recess made for it, it is necessary that it be so arranged that when the nut with the plug is inserted, the port in the latter will come opposite the one in the valve, when the spout is swung into the direction desired to discharge, as when the ports are not opposite there is no possibility of the escape of water.

What I claim is—

1. In combination with the case A, plug H, and nut C, the valve D, constructed and operated substantially in the manner shown and described.

2. The combination of the plug H with rim $x$ with the nut C and valve D, forming the packing-box, and having its wear taken up by the pressure of the valve, substantially as shown and described.

OAKLEY N. AMES.

Witnesses:
GEORGE H. AMES,
EZBON SHARPE.